United States Patent
Cheung et al.

(10) Patent No.: US 7,171,577 B2
(45) Date of Patent: Jan. 30, 2007

(54) METHODS AND APPARATUS FOR A SYSTEM CLOCK DIVIDER

(75) Inventors: Hugo Cheung, Tucson, AZ (US); Herbert Braisz, Marana, AZ (US)

(73) Assignee: Texas Instruments Incorporated, Dallas, TX (US)

(*) Notice: Subject to any disclaimer, the term of this patent is extended or adjusted under 35 U.S.C. 154(b) by 440 days.

(21) Appl. No.: 10/681,675

(22) Filed: Oct. 6, 2003

(65) Prior Publication Data
US 2005/0076258 A1 Apr. 7, 2005

(51) Int. Cl.
*G06F 1/04* (2006.01)
(52) U.S. Cl. .................. 713/501; 713/322; 713/601
(58) Field of Classification Search ........... 713/300, 713/320, 400, 500, 501, 601, 322
See application file for complete search history.

(56) References Cited

U.S. PATENT DOCUMENTS

| | | | | |
|---|---|---|---|---|
| 3,867,614 A | * | 2/1975 | White | 377/20 |
| 4,947,411 A | * | 8/1990 | Shiraishi et al. | 377/47 |
| 5,410,683 A | * | 4/1995 | Al-Khairi | 713/501 |
| 6,060,902 A | * | 5/2000 | Albu et al. | 326/38 |
| 6,111,595 A | * | 8/2000 | Hertrich | 348/22 |
| 6,337,600 B1 | * | 1/2002 | Shigemori et al. | 331/16 |

OTHER PUBLICATIONS

Dallas Semiconductor, DS1075 EconOscillator/Divider, Nov. 16, 1997, pp. 1-18.*

* cited by examiner

*Primary Examiner*—Dennis M. Butler
(74) *Attorney, Agent, or Firm*—W. James Brady, III; Frederick J. Telecky, Jr.

(57) ABSTRACT

A power-saving clock divider scheme is cost-effective, flexible, jitterless, and allows the user to keep track of time. In general, the clock divider selectively operates in a normal mode and one or more divide modes, wherein the divide modes provide a clock frequency that is a fraction of the normal clock frequency by a divisor value that is specified in a user-accessible divider register. Lower divisor values (e.g., 2, 4, 8, etc.) are preferably used for performance tuning, while large divisor values (e.g., 1024, 2048, and 4096) are preferably used for power saving.

9 Claims, 2 Drawing Sheets

METHODS AND APPARATUS FOR A SYSTEM CLOCK DIVIDER

FIELD OF THE INVENTION

The present invention relates, generally, to clock circuits and, more particularly, to an improved clock circuit incorporating a power-saving system clock divider.

BACKGROUND OF THE INVENTION

The heart of any microprocessor, microcontroller, or data-acquisition system lies in its clock circuitry, which provides critical timing information to the various subsystems. In many applications—for example, data acquisition systems—the components experience long wait periods punctuated by brief periods of high-load activity. In such cases, it is desirable to save power by switching the clock speed between two modes of operation, i.e., by reducing the clock frequency during wait mode, then increasing the clock to a normal, fast frequency during heavy load conditions.

Currently known methods of implementing this power saving method are unsatisfactory in a number of respects. For example, when these systems switch to a slower clock frequency, the user is unable to keep time (i.e., real time) because the timers are then running at different speeds. One prior art solution to this problem involves implementing an additional real time clock source. This solution, however, greatly increases power consumption and cost.

Furthermore, most prior art devices use a phase-locked loop (PLL) to switch between different clock frequencies, leading to undesirable jitter on the clock line. This jitter affects and can even disable communication between other devices in the system.

SUMMARY OF THE INVENTION

The present invention generally provides a power-saving clock divider scheme that is cost-effective, flexible, jitter-less, and allows the user to keep track of time. In general, the clock divider selectively operates in a normal mode and one or more divide modes, wherein the divide modes provide a clock frequency that is a fraction of the normal clock frequency by a divisor value that is specified in a user-accessible divider register. Lower divisor values (e.g., 2, 4, 8, etc.) are preferably used for performance tuning, while large divisor values (e.g., 1024, 2048, and 4096) are preferably used for power saving. In accordance with one embodiment of the present invention, a millisecond interrupt counter is used during state transitions to provide tracking of elapsed time.

BRIEF DESCRIPTION OF THE DRAWINGS

The subject invention will hereinafter be described in conjunction with the appended drawing figures, wherein like numerals denote like elements, and.

DETAILED DESCRIPTION

Figure 1:
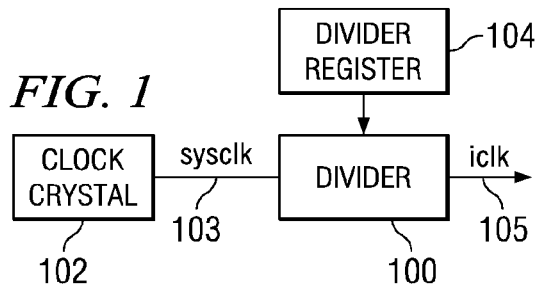
FIG. 1 is a schematic functional block diagram depicting operation of a divider in accordance with the present invention.

Referring now to FIG. 1, a system clock divider in accordance with the present invention generally includes a divider circuit (or simply "divider" 100) configured to accept a first clock signal 103 (sometimes referred to herein as "sysclk") from a clock crystal 102. Divider 100 is configured to produce a second clock signal 105 (or "iclk") whose frequency is responsive to clock signal 103 and the contents of a divider register 104. Divider register 104 can be written and read to control and determine the status of divider 100.

In one embodiment, divider register 104 contains a mode indicator (or "DIVMODE") and a divisor indicator ("DIV"), wherein the mode indicator is used to selectively place divider 100 in a normal mode or a plurality of divide modes, and the divisor indicator is used to selectively determine the clock divisor used on one or more of the divide modes. In normal mode, the frequency and phase of clock signal 105 (iclk) is the same as the frequency of signal 103 (sysclk); in divide mode, however, the frequency of clock signal 105 is less than that of signal 103 by the divisor value selected by the divisor indicator, thereby achieving the desired power savings. The iclk signal may then be provided to various blocks or subsystems, for example, a CPU, serial ports, an SPI, a flash controller, a system timer, a watch dog timer, an analog-to-digital converter, or the like.

Divider register 104 may be a register of any convenient length (e.g., 8-bits, 16-bits, etc.) and may include any number of other parameters. Similarly, the mode indicator DIVMODE and divisor indicator DIV may have any convenient bit lengths, depending upon the application. In the illustrated embodiment, divider register 104 is an 8-bit word, and DIVMOD uses two bits to select from three dividing modes:

| DIVMOD | Divide Mode |
| --- | --- |
| 00 | Normal mode |
| 01 | Immediate mode |
| 10 | Delay mode |
| 11 | Medium mode |

Although the nature of these modes will be discussed in further detail below, "normal mode" refers to a mode wherein no dividing occurs, and two modes ("immediate mode" and "delay mode") refer to divide modes wherein sysclk is divided by the indicated divisor value. The two divide modes differ in the way in which they are initiated and how they return to normal mode in response to various interrupts. Furthermore, medium mode allows immediate divide but exit only upon DIVMOD changing to normal mode.

Divider 100 is placed into the appropriate mode by writing the desired value in the DIVMOD bits of divider register 104. Similarly, the status of divider 100 is determined by reading the DIVMOD bits of divider register 104. Those skilled in the art will appreciate that the table presented below does not limit the present invention, and that the number of modes and the number of bits used to indicate those modes may vary depending upon the desired design.

The divisor indicator of divider register 104 specifies a range of predetermined divisor values. The set of available divisor values may vary depending upon the clock design. In one embodiment of the present invention, the divisor value is selected from a set of divisor values, each of which are of the form $2^n$, wherein n is a whole number. In the illustrated embodiment, for example, the system clock divider has the following set of eight divisor values: {2, 4, 8, 16, 32, 1024, 2048, 4096}. In the illustrated embodiment, the divisor indicator DIV and divisor values are specified via three bits as follows:

| DIV | Divisor |
|-----|---------|
| 000 | Divide by 2 (default) |
| 001 | Divide by 4 |
| 010 | Divide by 8 |
| 011 | Divide by 16 |
| 100 | Divide by 32 |
| 101 | Divide by 1024 |
| 110 | Divide by 2048 |
| 111 | Divide by 4096 |

Lower divisor values (e.g., 2, 4, 8, etc.) are preferably used for performance tuning, while large divisor values (e.g., 1024, 2048, and 4096) are preferably used for power saving. In a case where DIV is a three-bit number and DIVMOD is a two bit number, the system clock divider register may be specified as:

| Bit | Value |
|-----|-------|
| 7 | 0 |
| 6 | 0 |
| 5 | DIVMOD1 |
| 4 | DIVMOD0 |
| 3 | 0 |
| 2 | DIV2 |
| 1 | DIV1 |
| 0 | DIV0 |

The present is not so limited, however; any number of other divider register designs may be used in connection with the present invention.

Figure 2:
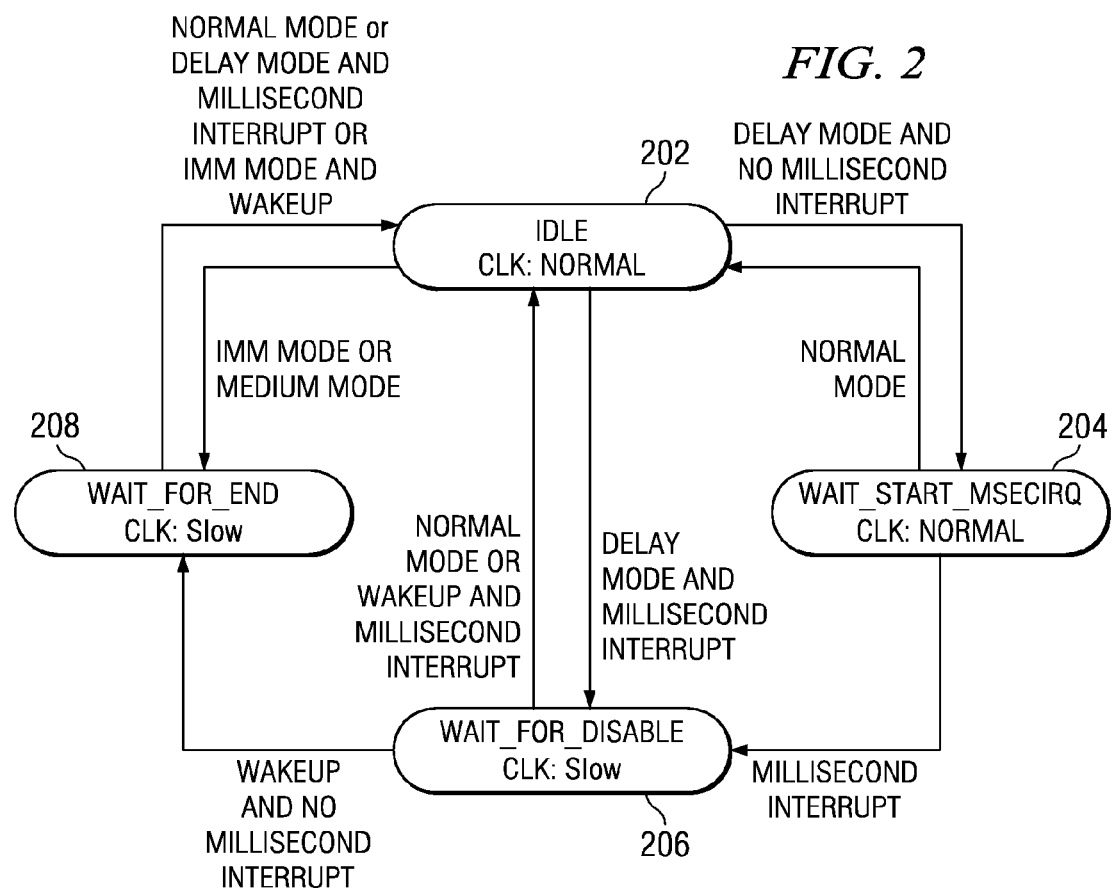
FIG. 2 is a finite state machine in accordance with one embodiment of the present invention.

Having thus given an overview of a divider register in accordance with the present invention, an exemplary process for entering and exiting these modes will now be described in conjunction with the finite state machine (or "FSM") shown in FIG. 2. As shown in FIG. 2, the divider suitably includes four states: an IDLE state 202, a WAIT_START_MSECIRQ state 204, a WAIT_FOR_DISABLE state 206, and a WAIT_FOR_END state 208. The divider clock signal (iclk) is normal in states 202 and 204, and divided (by the appropriate divisor value) in states 206 and 208.

In normal mode, the divider is in IDLE state 202. When the system senses that the division mode status has changed (i.e, through writing of the divide mode bits of the divider register set forth above), the state of the divider changes in accordingly.

If the system is placed in immediate mode, the system enters WAIT_FOR_END state 208 and the iclk signal is slowed by a factor determined by the divisor value. If the system is placed in delay mode, the state change is determined by the millisecond interrupt (MSINT). If the user wants to switch to delay mode, and at the time of the change (write to divide register) a MSINT appears, then the FSM switches to WAIT_FOR_DISABLE. If the user writes to the divide register and at that moment MSINT does not appear, the FSM goes first to state 204 and waits for the MSINT before changing to 206. The transition 202 to 206 is very unlikely, because it has to appear at the exact same clock pulse. In delay mode, the MSINT elapses slower than normal mode by a factor equal to the divisor; however, the CPU can maintain the number of slow MSINT elapsed without losing track of real time.

Once in WAIT_FOR_DISABLE state 206, the system returns to IDLE state 202 if: (1) normal mode is entered, or (2) a WAKEUP signal is received (from a CPU or other component) and MSINT has occurred. If a WAKEUP condition is present and MSINT has not occurred, the system enters WAIT_FOR_END state 208. In a preferred embodiment, the WAKEUP symbol is synchronized with iclk because the external interrupts are asynchronous. The nature of WAKEUP symbols are known in the art.

Once in WAIT_FOR_END state 208, the system returns to IDLE state 202 if: (1) normal mode is entered, (2) WAKEUP condition is present and the system is in immediate mode, or (3) the system is in delay mode and MSINT has occurred.

By using MSINT to enter and exit divide mode, the user is provided with a synchronization method to keep track of real time. For example, consider the case where the user switches to a divide mode wherein the divisor value is 2048 (normal clock frequency divided by 2048). If the user counts 16 millisecond interrupts until the system returns to normal clock frequency, the user merely has to multiply 2048×16 ms to compute the actual time that has passed during the divide mode. No additional real-time circuitry is needed.

In this way, the writing of DIVMOD and DIV within the divider register determines the state of the clock in conjunction with MSINT and WAKEUP. In the preferred embodiment, the various modes are not exited by directly clearing the DIVMOD bits of the register, but by generating the appropriate interrupts, either manually or through software generation.

In medium mode, the system enters divide mode immediately (as with immediate mode), but only exits as the result of DIVMOD being changed to normal mode. This mode is particularly useful for those who want to use IRQs for an application but do not want to leave divide mode. In this way, the system remains in divide mode, even if a WAKEUP occurs. In the finite state machine the system goes from IDLE state to WAIT_FOR_END, and exits when the normal mode bits are written to DIVMOD.

Figure 3:
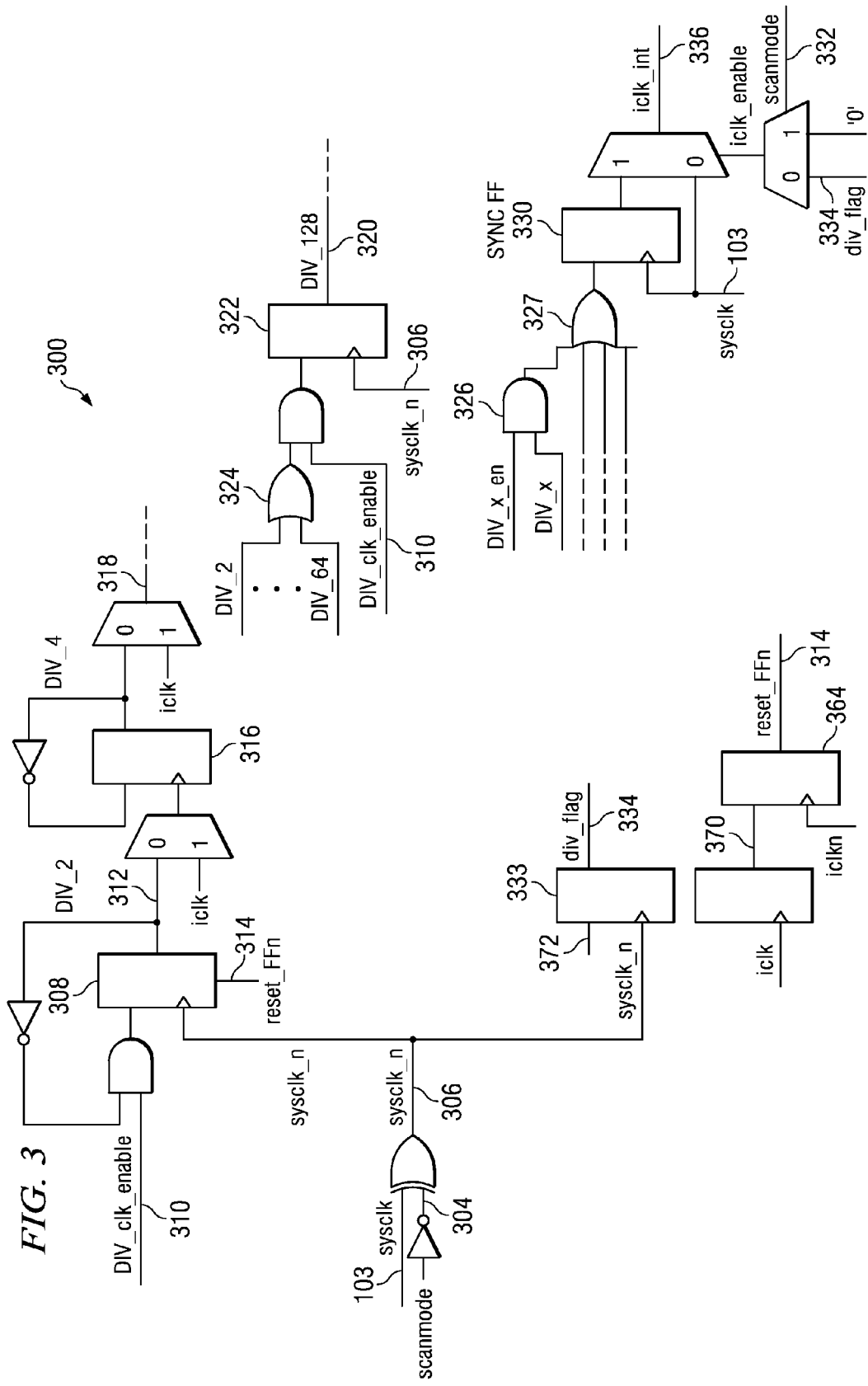
FIG. 3 is a schematic overview of a divider circuit implementation in accordance with one embodiment of the present invention.

FIG. 3 shows a schematic overview of one divider circuit 300 configured to implement various aspects of the present invention. Those skilled in the art will recognize the various digital logic symbols and naming conventions shown in FIG. 3. It is therefore unnecessary to present a detailed description of the basic operation of flip-flops, inverters, multiplexers, and other conventional components.

As shown, sysclk 103 and an inverted scanmode signal 304 produce an exclusive or signal sysclk_n signal 306, which is coupled to flip-flop 308 having a reset signal 314 (reset_FFn). Flip-flop 308 produces a DIV_2 (divide by two) signal 312 which is fed back through a logical AND block with a DIV_clk_enable signal 310 (i.e., a signal responsive to the clock divider being enabled). Similarly, the DIV_2 signal and iclk signal are multiplexed and used by flip-flop 316 to produce a DIV_4 signal. The DIV_4 signal is multiplexed with iclk to produce an output 318. The DIV_8, DIV_16, DIV_32, and DIV_64 signals are then produced in the same manner.

The DIV_2 through DIV_64 signals are coupled to a NOR block 324 which is then combined in a logical AND with DIV_clk_enable 310, the output of which is coupled to flip-flop 322. Flip-flop 322 uses sysclk_n 306 to produce the DIV__128 signal 320. Similar circuitry is used to generate the remaining high-divisor divide signals.

The various DIV_x_en and DIV_x signals are coupled to respective logical AND blocks 326 which are then coupled to OR block 327. The output of block 327 is coupled to SYNC flip-flop 330 which, in conjunction with sysclk signal 103, produces an output which is multiplexed with sysclk 103. The input to the final multiplexer is sysclk 103 and the output of flip-flop 330. The div_flag signal 334 and scanmode 332 produce a multiplexed iclk_enable signal which is used to produce an iclk_int signal 336. The iclk_int signal 336 is suitably used in conjunction with scanmode to produce the iclk signal. A flip-flop 333 is provided for using sysclk_n 306 as clock to produce a div_flag signal 334, and a reset_FFn 314 signal is produced by flip-flops 364. The data inputs 370 and 372 of flip flops 364 and 333 are generated from the states of the FSM.

In summary, what has been provided is a cost-effective, flexible, and jitterless power-saving clock divider scheme that allows the user to keep track of time. Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A system clock divider comprising:
    a divider register configured to store a mode indicator and a divisor indicator;
    a divider configured to accept a first clock signal having a first frequency as an input and produce a second clock signal having a second frequency responsive thereto, said divider having a normal mode and a divide mode selectable via said mode indicator, wherein:
    in said normal mode, said second frequency is substantially the same as said first frequency,
    in said divide mode, said second frequency is said first frequency divided by a divisor value corresponding to said divisor indicator; and
    transition from said second frequency equal said first frequency divided by a divisor value to said second frequency substantially the same as said first frequency is synchronized to said second frequency.

2. The system clock divider of claim 1, wherein said divisor value is selected from a set of divisor values including a first set of divisor values suitable for performance tuning, and a second set of divisor values suitable for power saving.

3. The system clock divider of claim 1, wherein said divisor value is selected from a set of divisor values, each of which is of the form $2^n$, wherein n is a whole number.

4. The system clock divider of claim 1, wherein said set of divisor values is {2, 4, 8, 16, 32, 1024, 2048, 4096}.

5. A system clock divider comprising:
    a divider register configured to store a mode indicator and a divisor indicator;
    a divider configured to accept a first clock signal having a first frequency as an input and produce a second clock signal having a second frequency responsive thereto, said divider having a normal mode and at least two divide modes selectable via said mode indicator, wherein:
    in said normal mode, said second frequency is substantially the same as said first frequency,
    in said first divide mode, said second frequency is less said first frequency by a divisor value corresponding to said divisor indicator; and
    in said second divide mode, said second frequency is less said first frequency by a divisor value corresponding to said divisor indicator, and wherein said second divide mode is entered and/or exited through the use of a user-countable millisecond interrupt signal.

6. The system clock divider of claim 5, wherein said divisor value is selected from a set of divisor values including a first set of divisor values suitable for performance tuning, and a second set of divisor values suitable for power saving.

7. The system clock divider of claim 5, wherein said divisor value is selected from a set of divisor values, each of which is of the form $2^n$, wherein n is a whole number.

8. The system clock divider of claim 5, wherein said set of divisor values is {2, 4, 8, 16, 32, 1024, 2048, 4096}.

9. A system clock divider comprising:
    a register configured to store a divisor indicator;
    a divider configured to accept a first clock signal having a first frequency and produce a second clock signal having a second frequency, wherein in a normal mode, said second frequency is substantially the same as said first frequency, and in a divide mode, said second frequency is less said first frequency by an amount corresponding to said divisor indicator and wherein transition from said second frequency less than said first frequency by an amount corresponding to said divisor indicator to said second frequency substantially the same as said first frequency is synchronized to said second frequency.

* * * * *